(12) United States Patent
Wooding et al.

(10) Patent No.: US 8,515,022 B2
(45) Date of Patent: Aug. 20, 2013

(54) SPEAKERPHONE AND EXTENSION SPEAKERPHONE FOR USE IN PERSONAL EMERGENCY RESPONSE SYSTEM

(75) Inventors: Anson William Wooding, Hudsn, MA (US); Martin E. Henderson, Wayland, MA (US); Alan David Brav, Middleton, MA (US)

(73) Assignee: Koninklijke Philips N.V., Eindhoven (NL)

( * ) Notice: Subject to any disclaimer, the term of this patent is extended or adjusted under 35 U.S.C. 154(b) by 291 days.

(21) Appl. No.: 12/997,365

(22) PCT Filed: Jun. 1, 2009

(86) PCT No.: PCT/IB2009/052299
§ 371 (c)(1),
(2), (4) Date: Dec. 10, 2010

(87) PCT Pub. No.: WO2009/153684
PCT Pub. Date: Dec. 23, 2009

(65) Prior Publication Data
US 2011/0081005 A1    Apr. 7, 2011

Related U.S. Application Data

(60) Provisional application No. 61/073,813, filed on Jun. 19, 2008.

(51) Int. Cl.
*H04M 11/00* (2006.01)

(52) U.S. Cl.
USPC .................................. 379/51; 379/37; 379/38

(58) Field of Classification Search
USPC ......... 379/37–45, 51, 387.01, 388.01–390.04
See application file for complete search history.

(56) References Cited

U.S. PATENT DOCUMENTS

| | | |
|---|---|---|
| 5,305,370 A | 4/1994 | Kearns et al. |
| 5,589,818 A | 12/1996 | Queen |
| 5,673,304 A | 9/1997 | Connor et al. |
| 2006/0035635 A1 | 2/2006 | Kumagai |
| 2007/0206729 A1 | 9/2007 | Baum et al. |
| 2007/0286375 A1 | 12/2007 | Baum |

FOREIGN PATENT DOCUMENTS
EP   0522629 A2   12/2010

*Primary Examiner* — Stella Woo

(57) ABSTRACT

A personal emergency response system (PERS) includes a base unit (16) and one or more extension units (20). The base unit includes a speaker (64), a microphone (72), a telephone interface circuit (40), a microcontroller (46), and an autodialer (48). Each extension unit includes a speaker (164), a microphone (172), a telephone interface circuit (140), and a controller (146) without an autodialer. The base unit controller (46) and the extension unit controller (146) are programmed such that in a help mode, the base unit controller and the extension unit controller assume a master/slave relationship.

16 Claims, 3 Drawing Sheets

SPEAKERPHONE AND EXTENSION SPEAKERPHONE FOR USE IN PERSONAL EMERGENCY RESPONSE SYSTEM

The present application is particularly applicable to personal emergency response systems (PERS) and will be described with particular reference thereto. However, it is to be appreciated that it might also be applicable to other types of personal communication systems.

Personal emergency response systems typically include a base unit which automatically telephones a call center when activated by the subscriber. The subscriber typically can press a call or emergency button on the base unit or on a remote RF unit which the subscriber carries with them to activate the automatic calling. The base unit typically functions as a speakerphone to establish voice communication between the call center and a subscriber who may or may not be at the base unit. For example, a subscriber may have fallen and may be unable to stand or move to the base unit.

The problem encountered by some subscribers is that their living space is such that a single base unit is not sufficient. The subscriber may not be able to hear the base unit in all portions of the living space. Conversely, the subscriber may not be able to speak with sufficient loudness to communicate with the base unit from all areas of the living space.

One potential solution would be to provide additional base units in other areas of the living space. However, multiple base units would require multiple telephone lines. Each base unit includes an automatic dialer for calling the call center. As a result, if two or more base units, potentially with a slight time delay, were to try to dial the call center concurrently, the two calls could interfere and result in a failure to reach the call center.

The present application describes an improved speakerphone system which overcomes the above-referenced problems and others.

In accordance with one aspect, a personal emergency response system is provided. The system includes a base unit which includes a speaker, a microphone, a telephone interface circuit connected with the speaker, the microphone, and a telephone line, a microcontroller, and an autodialer. The system further includes one extension unit which includes a speaker, a microphone, a telephone interface circuit connected with the speaker, the microphone, and the telephone line, and the controller without an autodialer. The base unit controller and the extension unit controller are programmed such that in a help mode, the base unit controller and the extension unit controller assume a master/slave relationship.

In accordance with another aspect, a method of using the personal response system is provided. In response to receiving an indication that the help mode is to be entered, the base unit microcontroller is placed in a help mode, the autodialer is triggered to dial a preselected number, and the base and extension unit microphones are muted.

Upon establishing a communication link with a call center, a prerecorded voice chip is triggered to alert the subscriber to the successful connection of the link. The gains of the base and extension unit microphones are un-muted and adjusted to enable an operator at the call center to hear sounds emanating from a subscriber.

In accordance with another aspect, an extension speakerphone unit is provided. The extension speakerphone unit includes a speaker, a microphone, a telephone interface circuit for connecting the speaker and the microphone to a telephone line, and a control processor without an autodialer. The telephone interface circuit draws less than 30 mA from the telephone line. The control processor is configured to be switched into a slave mode in response to signals received over the telephone line from a base unit control processor.

In accordance with another aspect, a personal emergency response method is provided. In response to receiving at a controller of a base speakerphone unit a signal indicating that a help mode is to be entered, sending a signal over a telephone line to a controller of an extension speakerphone unit to place the extension unit controller in a slave mode. Communications are established over the phone line with a call center such that the base and extension units both can transmit signals concurrently or individually on and receive signals concurrently from the telephone line.

One advantage is that a subscriber can have multiple speakerphone units.

Another advantage resides in the ability of a subscriber to hear and be heard in any part of an expanded part of the living space.

Still further advantages and benefits will become apparent to those of ordinary skill in the art upon reading and understanding the following detailed description.

The invention may take form in various components and arrangements of components, and in various steps and arrangements of steps. The drawings are only for purposes of illustrating the preferred embodiments and are not to be construed as limiting the invention.

Figure 1:
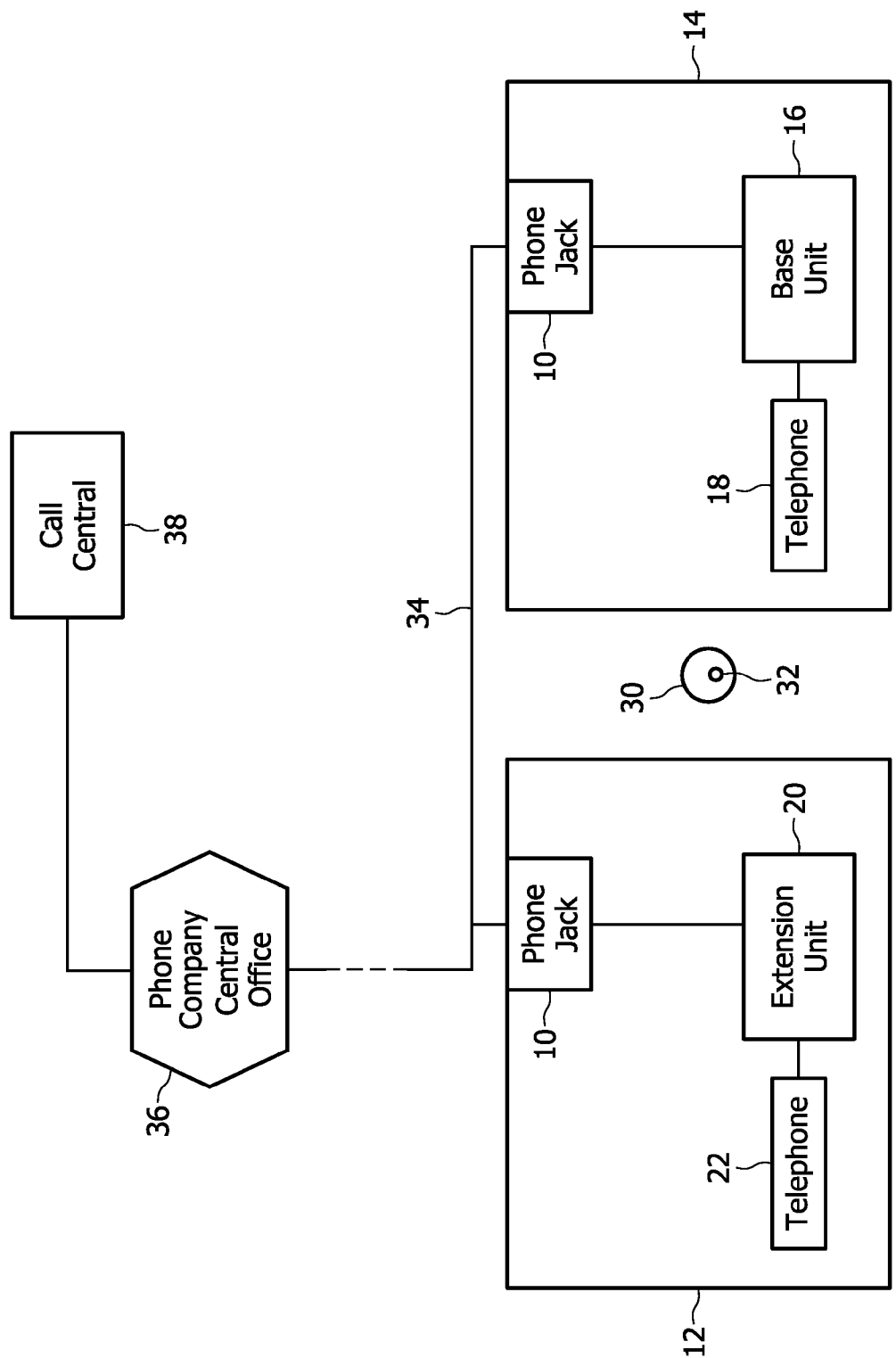
FIG. 1 is a diagrammatic illustration of a personal emergency response system.

With reference to FIG. 1, a subscriber's living space includes a plurality of phone jacks 10, such as phone jacks in a first room 12 and a second room 14. In the second room 14, a personal emergency response system (PERS) includes a base communication unit 16 that is interconnected with the phone jack 10. Optionally, a telephone 18 is connected with the phone jack 10 via the base unit 16. In the other room 12, the PERS further includes at least one extension speakerphone unit 20 which is connected with the phone jack 10. Optionally, a telephone 22 is interconnected with the phone jack 10 via the extension unit 20. There may be additional rooms with additional extension units 20 like room 12, but such rooms are not shown. The subscriber wears or carries an RF remote unit 30 including an emergency button 32. When the subscriber presses the emergency button 32 or analogous emergency buttons on the base unit, the base unit 16 dials over a common phone line 34 shared by the base unit 16 and one or more extension units 20 via a phone company central office 36 to an operator at the call center 38. The base unit 16 then places both itself and the one or more extension units 20 in an alarm mode in which both the base unit and the one or more extension units 20 go off-hook and concurrently listen for and transmit sounds from the subscriber or concurrently transmit voice communications to broadcast to the subscriber.

Figure 2:
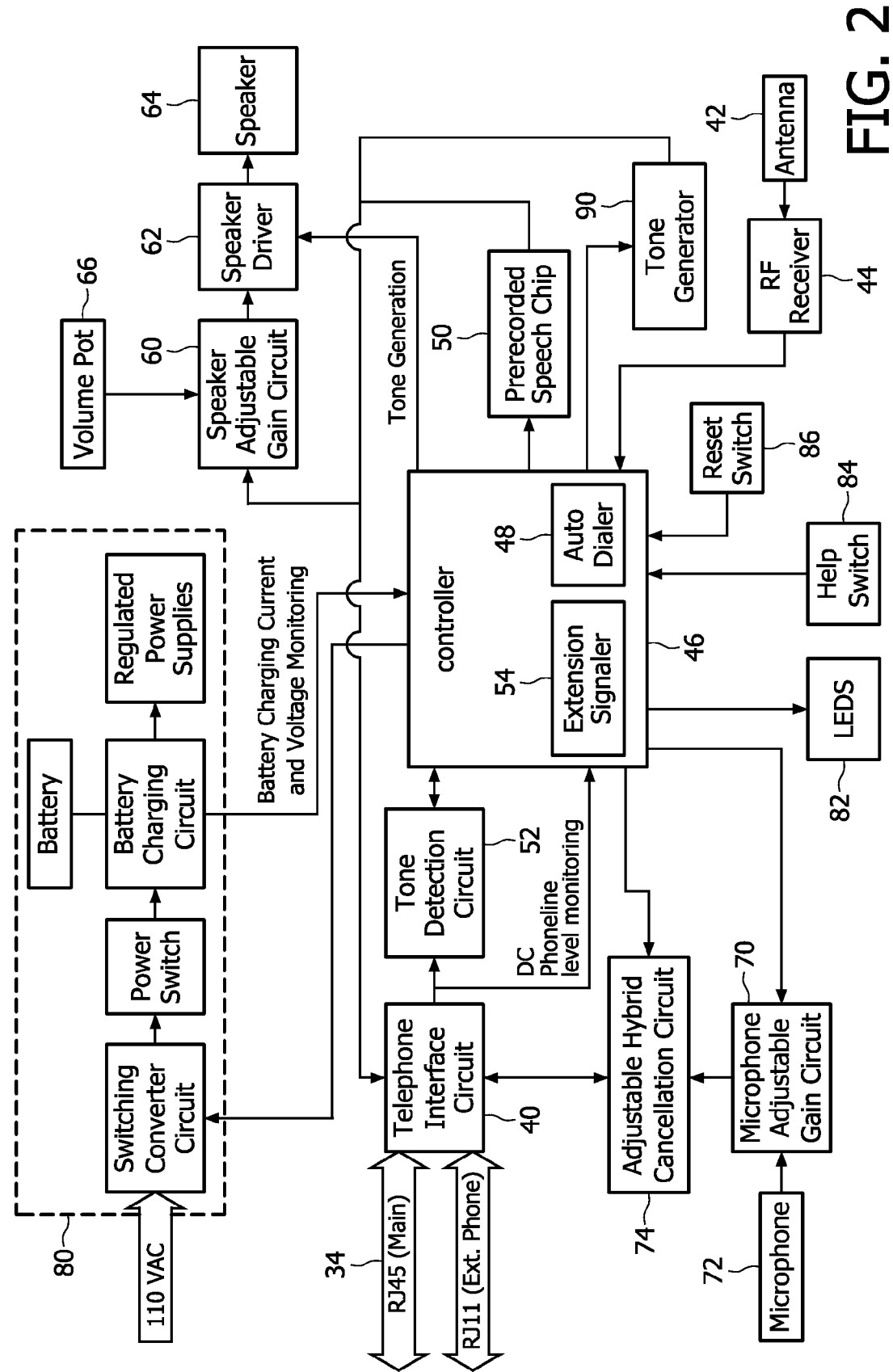
FIG. 2 is a detailed diagram of the base unit 16 of FIG. 1.

With reference to FIG. 2, the base unit 16 of the PERS includes a telephone interface circuit 40 which is connected with the phone jack 10 and with the extension phone 18 via RJ11. The telephone interface circuit 40 enables the telephone 18 to be used to place and receive phone calls and, as described below, enables base unit 16 to place telephone calls.

The base unit 16 further includes an antenna 42 and RF receiver 44 which receive RF signals from the RF remote unit 30. When a signal from the RF remote unit 30 is received, a controller 46 enters a help or emergency mode. The controller 46 causes the telephone interface circuit 40 to request a dial tone (place a load across the common telephone line 34). The controller 46 includes or is connected to an automatic dialer 48 so that upon receiving a dial tone, the controller 46 activates the automatic dialer 48 which dials the telephone number for the call center 38. When voice communication is established, a pre-recorded voice chip 50 provides a voice message identifying a successful connection to the subscriber. A tone detection circuit 52 monitors the phone line 34 for a dial tone which the controller 46 waits to receive before triggering the autodialer 48. Also, the tone detection circuit 52 monitors the phone line for the level of sound when communications are received from the call center 38. The controller 46 includes or is connected with an extension signaling unit 54 which communicates with the one or more extension units 20 to alert it that the help or emergency mode has been entered and signals it to go off-hook. In the illustrated embodiment, the base unit controller 46 communicates with the one or more extension units 20 over the phone line 34.

After a call is initiated by a subscriber through, for example, the RF receiver 44 receiving RF signals from the RF remote unit 30, a speaker adjustable gain circuit 60 and a speaker driver 62 drive a loudspeaker 64 (with volume optionally adjustable by a gain adjustment 66) to audibly broadcast voices or sounds received over the telephone line 34 from the call center 38. This is accomplished as follows. As previously explained, when the signal from the RF remote unit 30 is received by the RF receiver 44 to initiate a call, the controller 46 enters a help or emergency mode. In the help or emergency mode, the controller 46 enables the speaker driver 62 when a communication is received from the call center 38 (receive mode) and, in one embodiment, controller 46 disables or mutes the speaker driver 62 when a communication is transmitted to the call center 38 (transmit mode).

If a subscriber is communicating to the call center 38 in a transmit mode, an adjustable microphone gain circuit 70 amplifies voices or sounds picked up by a microphone 72 in the base unit 16. The sounds are communicated by an adjustable hybrid cancellation circuit 74 to the telephone interface circuit 40 to be placed as appropriate outgoing signals on the telephone line 34. The adjustable hybrid cancellation circuit 74 is controlled by the controller 46 in order to reduce the signal level received by the base unit 16 while the base unit is transmitting signals to the call center 38. Thus, in the transmit mode, the microphone signal can be amplified to bring the sounds to a selected level to compensate for the subscriber being far from the microphone 72 or unable to speak loudly. In the receive mode, the microphone 72 is muted or disconnected.

Alternatively, when the units 12, 14 switch between the transmit and receive modes independently, the loudspeaker 64 is driven at a constant volume in one of units 12, 14 in the receive mode while the microphone gain of the other of units 12, 14 is adjusted (e.g., replaced as needed) until feedback is eliminated in the transmit mode.

A power supply 80 provides appropriate electrical power to the controller 46, the speaker driver 62, the microphone gain circuit 70, and other system components. In the illustrated embodiment, the power supply 80 is interconnected with a standard household wall socket and includes for example an emergency battery backup. A regulator regulates the voltage to the appropriate levels for the various circuit components.

Indicators 82, such as LEDs, are mounted to be displayed on the face of the base unit 16 to provide the user with an indication of the various states of the base unit 16.

A help button or help switch 84 is disposed on the base unit 16 to enable the subscriber to trigger the help or emergency mode locally at the base unit 16 instead of remotely at the RF remote unit 30. That is, the subscriber can press the help button or switch 84 rather than the help button 32 on the remote unit 30 to initiate the help or emergency mode. A reset switch or button 86 is also disposed on the base unit 16 to cancel the help or emergency mode.

Figure 3:
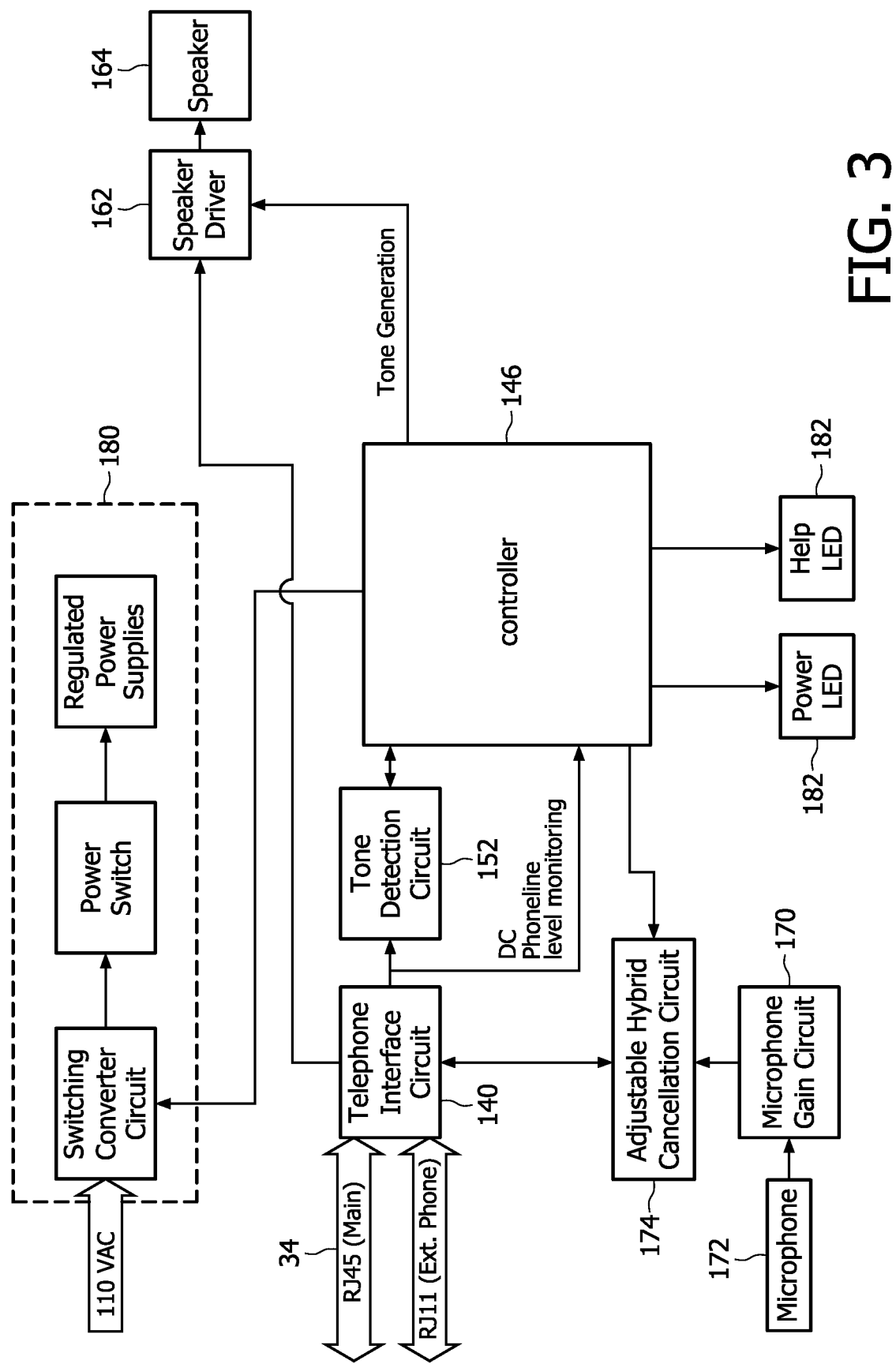
FIG. 3 is a detailed diagram of the extension unit 20 of FIG. 1.

With reference to FIG. 3, each extension unit 20 of the PERS includes a telephone interface circuit 140. However, unlike the base unit interface circuit 40, the extension unit telephone interface circuit 140 is constructed to draw a low loop current. Typically, a loop current of 30 mA triggers the central office 36 to recognize that a call is to be made and to emit a dial tone. The components of the extension telephone interface circuit 140 are selected to draw a loop current well below 30 mA, e.g., 2 or 3 mA to avoid unintentional triggering of the central office.

An extension unit controller 146 receives, via a tone detection circuit 152, sounds received over the phone line. When the controller 146 receives the signal from the base unit 16 indicating that it should enter a help or emergency mode, the controller 146 causes the telephone interface circuit 140 of the extension unit 20 to go off-hook (connect to the phone line). The controller 146 also activates a speaker driver 162 to amplify voice and other sounds received from the call center 38 via the telephone interface circuit 140 to a selected level and supply them to a speaker 164. The extension unit controller 146 does not include an autodialer.

A microphone gain circuit 170 and a microphone 172 pick up sounds adjacent the extension speakerphone unit 20 and communicate them to the telephone interface circuit 140 via an adjustable hybrid cancellation circuit 174. Like the base unit controller 46, the extension unit controller 146 enables the speaker and disables the microphone in the receive mode and disables the speaker and enables the microphone in the transmit mode. The extension unit controller 146 also controls the volume of the speaker in the receive mode and adjusts the gain of the microphone to a preselected amplitude in the transmit mode. Alternatively, the volume can be set to a selected level in the receive mode and the gain of the microphone can be adjusted to provide as much gain as possible (up to a selected limit) without feedback in the transmit mode.

A power supply 180 supplies regulated power to the controller 146 and other components of the extension speakerphone unit 20. The power supply 180 is for example connected with a standard wall socket. Optionally, a battery back-up may also be provided (not shown).

The extension speakerphone unit also includes indicators 182 such as LEDs to indicate when the extension unit has power or is in the help mode.

When the home system is in its normal, non-alarm mode, the subscriber can use the handset 18 connected with the base unit 16 or the handset 22 connected with the extension unit 20 to make and receive conventional telephone calls. When the help button 84 is pressed on the base unit or the patient-carried unit 30, the controller 46 in the base unit 16 assumes control of the PERS. The base unit controller 46 and the extension unit controller 146 are configured to assume a master-slave relationship in help mode with the base unit controller 46 configured to assume the "master" role and the extension unit controller 146 configured to assume the "slave" role. The base unit controller 46 signals the extension unit controller 146 to place the extension unit in its alarm mode. On entering the alarm mode, the base unit controller 46 controls the telephone interface unit 40 to apply a load across the phone lines or otherwise ask for a dial tone. On entering the alarm mode, the extension unit controller 146 in the extension unit 20 controls the telephone interface circuit 140 to connect the speaker and microphone with the telephone line 34. The controller 46 on the base unit 16 enables the autodialer 48 to dial the call center 38. Upon sensing a specific "handshake" tone from the call center 38 indicating that the call center 38 is ready to receive information from the base unit 16, the base unit controller 46 actuates a tone generation circuit 90 to cause information to be transmitted which identifies the subscriber and the alarm condition to the call center 38.

Once communication with the call center 38 has been established, the base and extension controllers 46, 146 arbitrate between the gain control and driver circuits for the speakers and the gain control and hybrid cancellation circuits for the microphones. The controllers 46, 146 monitor the amplitude of the signal received on the phone line and the amplitude of the signal received from the microphones. In one embodiment, the speaker adjustment gain or driver circuits are reduced or nulled when the amplitude of the signal from the microphone indicates that the subscriber is speaking. Alternately, the gain to the speakers can be reduced or zeroed in response to the controller sensing that the call center 38 is listening, i.e., a very low amplitude signal is being received on the phone line. The controller monitors the amplitude of the signal from the microphone and adjusts the gain to bring the amplitude of the signal up to a nominal value. In this manner, if the only sound is very soft, such as irregular breathing by the subscriber, the breathing sound is amplified sufficiently for the call center to hear it.

In another embodiment, when the controllers 46, 146 sense that the amplitude of the signal received from the call center 38 is sufficiently high that it is indicative of the call center representative speaking, the controllers switch to the receive mode. In the receive mode, the controllers reduce or null the output of the microphone to prevent a feedback loop from being established. When the controllers sense a lack of speech from the call center 38, the controllers enter the transmit mode. In the transmit mode, the microphone outputs are both amplified to the selected amplitude and applied to the telephone line. When one of the controllers 46, 146 senses feedback, the speaker can be turned off. In another variation, the speakers can be turned off in the transmit mode regardless of feedback. That is, the controllers are configured to toggle between (1) the speakers being on at the selected volume and the microphones being disconnected in the receive mode and (2) the speakers being disconnected and the microphones enabled in the transmit mode. In another variation, the speakers are configured to amplify to the selected volume and the gains of the microphones are adjusted to minimize feedback. It is also possible for the base and extension units to be configured to switch independently between the transmit and receive modes.

Various techniques can be utilized to determine whether the call center representative is speaking. For example, the incoming signal on the phone line can be sampled periodically. To distinguish over natural pauses occurring during speaking, the amplitude of the incoming signal can be averaged for a nominal duration. If the average is above a minimum threshold, then the current peak value of the signal received on the telephone line can be compared to the average. When the peak value is below the average for a preselected duration, e.g., one second, the controllers can respond by entering the transmit mode. The transmit mode can also be entered when the amplitude of the signal received on the phone lines has an average value below the minimum threshold. Detection of a signal received on the phone lines which is above the threshold for one or a preselected plurality of samplings, can be taken by the controllers as an indication that the call center representative is speaking and the receive mode is entered.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. A personal emergency response system comprising:
 a base unit including:
   a base unit speaker,
   a base unit microphone,
   a base unit telephone interface circuit connected with the base unit speaker and the base unit microphone and a telephone line,
   a base unit controller,
   an autodialer,
   a base unit adjustable hybrid cancellation circuit controlled by the base unit controller and connected between the base unit microphone and the base unit telephone interface circuit, the base unit adjustable hybrid cancellation circuit being configured to reduce a base unit speaker adjustment gain when at least one of a first amplitude of a base unit microphone signal is above a first predetermined threshold and a second amplitude of a telephone line signal is below a second predetermined threshold, and
   a base unit microphone adjustable gain circuit controlled by the base unit controller to adjust the base unit microphone gain, the base unit microphone adjustable gain circuit being configured to amplify output sound to a first preselected level when sound is transmitted out over the telephone line and for muting the base unit microphone when speech is being received on the telephone line;
 one or more extension units each including:
   an extension unit speaker,
   an extension unit microphone,
   an extension unit telephone interface circuit connected with the extension unit speaker and the extension unit microphone and the telephone line,
   an extension unit controller without an autodialer,
   an extension unit adjustable hybrid cancellation circuit controlled by the extension unit controller and connected between the extension unit microphone and the extension unit telephone interface circuit, the extension unit adjustable hybrid cancellation circuit being configured to reduce an extension unit speaker adjustment gain when at least one of a first amplitude of an extension unit microphone signal is above a third predetermined threshold and the second amplitude of the telephone line signal is below a fourth predetermined threshold, and
   an extension unit microphone adjustable gain circuit controlled by the extension unit controller to adjust the extension unit microphone gain to amplify output sound to a second preselected level when sound is transmitted out over the telephone line and for muting the extension unit microphone when speech is being received on the telephone line;
 wherein the base unit controller and the extension unit controller are programmed such that in a help mode, the base unit controller and the extension unit controller assume a master-slave relationship.

2. The personal emergency response system according to claim 1, wherein the extension unit telephone interface circuit draws a loop current from the telephone lines of less than 30 mA such that the extension unit telephone interface circuit does not signal a phone company central office for a dial tone.

3. The personal emergency response system according to claim 1, further including at least one of a remote unit for transmitting a radio frequency signal and a help switch for triggering the help mode.

4. The personal emergency response system according to claim 3, wherein the base unit further includes:
an antenna and an RF receiver for receiving the radio frequency signal from the remote unit.

5. The personal emergency response system according to claim 1, wherein the base unit telephone interface circuit and the extension unit telephone interface circuit are connected with a common telephone line, the base unit controller communicating with the extension unit controller via the common telephone line.

6. The personal emergency response system according to claim 5, wherein the base unit further includes at least one of a button and an RF receiver for signaling the base unit controller to enter the help mode, the base unit controller including an extension signaling unit which signals the extension unit controller over the common phone line to instruct the extension unit controller to enter the help mode.

7. The personal emergency response system according to claim 1, wherein at least one of the base unit controller and the extension unit controller include a feedback loop prevention routine to prevent a feedback loop from being formed between one or more of the speakers and one or more of the microphones.

8. The personal emergency response system according to claim 1, wherein the base unit controller and the extension unit controller are programmed to monitor the telephone line and enter a receive mode when speech is being received on the telephone line and a transmit mode in the absence of speech on the telephone line.

9. The personal emergency response system according to claim 8, wherein:
in the receive mode, the base unit and extension unit speakers are set to a preselected volume and the base unit and extension unit microphones are disconnected; and
in the transmit mode, the base unit and extension unit microphones are connected and the base unit and extension unit speakers are disconnected or muted.

10. A method of using the personal emergency response system according to claim 1, the method comprising:
in response to receiving an indication that the help mode is to be entered, communicating with the extension unit controller to place the extension unit controller in the help mode, triggering the autodialer to dial a preselected phone number, muting the base unit and extension unit microphones, and listening for a communication link to be established with a call center;
upon establishing the communication link with a call center, triggering a tone generation circuit to send information to identify a subscriber to the call center; and
un-muting and adjusting the gains of the base unit and extension unit microphones to enable an operator at the call center to hear sounds emanating from a subscriber.

11. The method according to claim 10, further including:
monitoring the common telephone line which is connected to the base unit and extension unit for speech emanating from the call center;
in response to detecting the speech, entering a receive mode, and
in response to an absence of speech, entering a transmit mode.

12. The method according to claim 11, further including:
in the receive mode, muting or disconnecting the base unit and extension unit microphones; and
in the transmit mode, muting or disconnecting the base unit and extension unit speakers.

13. The method according to claim 11, further including:
in the transmit mode, sensing for feedback, and
in response to sensing feedback, decreasing amplification of signals from the base unit and extension unit microphones.

14. The personal emergency response system according to claim 1, wherein the first and second preselected levels are the same.

15. The personal emergency response system according to claim 1, wherein the first and third predetermined thresholds are the same and the second and fourth predetermined thresholds are the same.

16. An extension speakerphone unit comprising:
a speaker;
a microphone;
a telephone interface circuit for connecting the speaker and the microphone to a telephone line, the telephone interface circuit drawing a loop current of less than 30 mA from the telephone line such that the telephone interface circuit does not signal a phone company central office for a dial tone;
a control processor without an autodialer, the control processor being configured to be switched into a slave mode in response to signals received over the telephone line from a base unit control processor;
an adjustable hybrid cancellation circuit controlled by the controller and connected between the microphone and the telephone interface circuit, the adjustable hybrid cancellation circuit being configured to reduce a speaker adjustment gain when at least one of a first amplitude of a microphone signal is above a first predetermined threshold and a second amplitude of a telephone line signal is below a second predetermined threshold; and
a microphone adjustable gain circuit controlled by the controller to adjust the microphone gain to amplify output sound to a preselected level when sound is transmitted out over the telephone line and for muting the microphone when speech is being received on the telephone line.

* * * * *